United States Patent
Tani et al.

(10) Patent No.: US 6,810,860 B2
(45) Date of Patent: Nov. 2, 2004

(54) STARTING FUEL INJECTION CONTROL DEVICE OF INTERNAL COMBUSTION ENGINE

(75) Inventors: Hideaki Tani, Tokyo (JP); Hitoshi Inoue, Tokyo (JP); Koji Nishimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 95 days.

(21) Appl. No.: 10/134,611

(22) Filed: Apr. 30, 2002

(65) Prior Publication Data

US 2003/0094160 A1 May 22, 2003

(30) Foreign Application Priority Data

Nov. 20, 2001 (JP) .................................... 2001-354851

(51) Int. Cl.[7] ............................................. F02D 41/06
(52) U.S. Cl. ................................................... 123/491
(58) Field of Search ........................... 123/179.16, 490, 123/491

(56) References Cited

U.S. PATENT DOCUMENTS 6,357,418 B1 * 3/2002 Uemura et al. ........ 123/406.58
6,575,143 B2 * 6/2003 Uemura et al. ............. 123/490

FOREIGN PATENT DOCUMENTS

| JP | 5-222981 | 8/1993 |
| JP | 6-185387 | 7/1994 |
| JP | 06-249021 | 9/1994 |
| JP | 6-249021 | 9/1994 |
| JP | 6-330788 | 11/1994 |
| JP | 9-250380 | 9/1997 |

* cited by examiner

Primary Examiner—Tony M. Argenbright
(74) Attorney, Agent, or Firm—Sughrue Mion, PLLC (57) ABSTRACT

A starting fuel injection control device for an internal combustion engine including a unit for estimating the starting ability of the internal combustion engine, a crank angle detecting unit for outputting a crank angle signal in synchronization with a specific crank angle position of each cylinder of the internal combustion engine and a cylinder discriminating unit for discriminating a reference crank angle of a specific cylinder. The device also includes a unit for simultaneously injecting fuel to all the cylinders before the completion of the cylinder discrimination at the starting time and a unit for starting the independent injection by turns separately for each cylinder in synchronization with the crank angle signal from the time just after the completion of the cylinder discrimination, and a unit for starting simultaneously injects fuel to another cylinder where intake is possible.

9 Claims, 5 Drawing Sheets

STARTING FUEL INJECTION CONTROL DEVICE OF INTERNAL COMBUSTION ENGINE

This application is based on Application No. 2001-354851, filed in Japan on Nov. 20, 2001, the contents of which are hereby incorporated by reference.

BACKGROUND OF THE INVENTION

1. Field of the Invention

The present invention relates to a staring fuel injection control device for an internal combustion engine, where the fuel injection system at the starting time is improved.

2. Description of the Prior Art

In the case of performing fuel injecting to each cylinder of an internal combustion engine, it is necessary to judge to which cylinder, the injection should be performed, and therefore, the cylinder discrimination is performed, where the reference crank angle (for example, 75 degrees before the compression TDC) of a specific cylinder is discriminated. In order to perform this cylinder discrimination, it is necessary to actually operate the starter motor to rotate the crank shaft and the cam shaft of the internal combustion engine, and therefore, if the fuel injection is started for the first time after the completion of the cylinder discrimination, the completion of starting becomes late, and the starting ability becomes worse.

Therefore, conventionally, in order to improve the starting ability, in the time until the completion of the above described cylinder discrimination, the nonsynchronous injection is first performed to all the cylinders just after the start of the starting, and next, the synchronous injection is performed to all the cylinders in synchronization with the above described crank angle signal. Then, just after the completion of the above described cylinder discrimination, the above described sequential injection is started.

However, in the case of the above described fuel injection, the fuel injection is performed to all the cylinders in the state where the position of each cylinder is unclear during the time until the completion of the above described cylinder discrimination, and therefore, depending on the position, a cylinder where the intake valve is closed during the fuel injection may come into existence. In this cylinder, only part of the injection fuel is taken in, and therefore, the mixture in the cylinder becomes in the lean state, and the incomplete combustion such as lean misfire is caused, and a lot of unburned gas (HC) is discharged, and the exhaust gas emission becomes worse. Furthermore, in the cylinder where intake remainder is produced in the injection fuel, the remaining fuel which has not been taken in last time is also taken in at the next injection time, and therefore, there has been such a problem that excessive fuel is taken in the cylinder to cause the rich combustion, and the discharge amount of HC is still more increased.

The present invention is made to solve the above described problems, and it is an object to provided a starting fuel injection control device for an internal combustion engine, wherein while keeping starting ability, the incomplete combustion caused by the lean misfire or the rich combustion at the starting time can be prevented, and the discharge amount of HC at the starting time can be reduced.

SUMMARY OF THE INVENTION

The starting fuel injection control device for an internal combustion engine according to the invention includes a unit for estimating the starting ability of an internal combustion engine and a crank angle detecting unit for outputting a crank angle signal in synchronization with a specific crank angle position of each cylinder of the above described internal combustion engine. The device also includes a cylinder discriminating unit for discriminating a reference crank angle of a specific cylinder (hereafter referred to as "cylinder discrimination") , a first injection unit for simultaneously injecting fuel to all the cylinders before the completion of the above described cylinder discrimination at the starting time, and a second injection unit for starting the independent injection (hereafter referred to as "sequential injection") by turns for each cylinder in synchronization with the above described crank angle signal just after the completion of the above described cylinder discrimination. The device also includes a unit for stopping the above described simultaneous injection until the completion of the above described cylinder discrimination, only in the case where the starting ability of the above described internal combustion engine is estimated to be better than a specified level.

The starting fuel injection control device for an internal combustion engine according to the invention further includes a third injection unit for starting the above described sequential injection just after the completion of the above described cylinder discrimination only in the case where the starting ability of the above described internal combustion engine is estimated to be worse than a specified level different from the level to stop the above described simultaneous injection, and which simultaneously injects fuel to another cylinder where intake is possible, simultaneously with the first sequential injection.

The starting fuel injection control device for an internal combustion engine according to the invention further includes a unit for determining the period to stop the above described simultaneous injection in the time until the completion of the above described cylinder discrimination according to a previously set map.

The starting fuel injection control device for an internal combustion engine according to the invention further includes a unit for determining the injection cylinder according to a previously set map, in the case where there are a plurality of cylinders whose intake is possible other than the sequential injection starting cylinder in the above described simultaneous injection after the completion of the above described cylinder discrimination.

The starting fuel injection control device for an internal combustion engine according to the invention further includes a unit for determining the fuel injection amount independently for each cylinder according to a previously set map, in the above described simultaneous injection after the completion of the above described cylinder discrimination.

DETAILED DESCRIPTION OF THE PREFERRED EMBODIMENTS

The preferred embodiments of the present invention will be described below according to the drawings.

Embodiment 1

Figure 1:
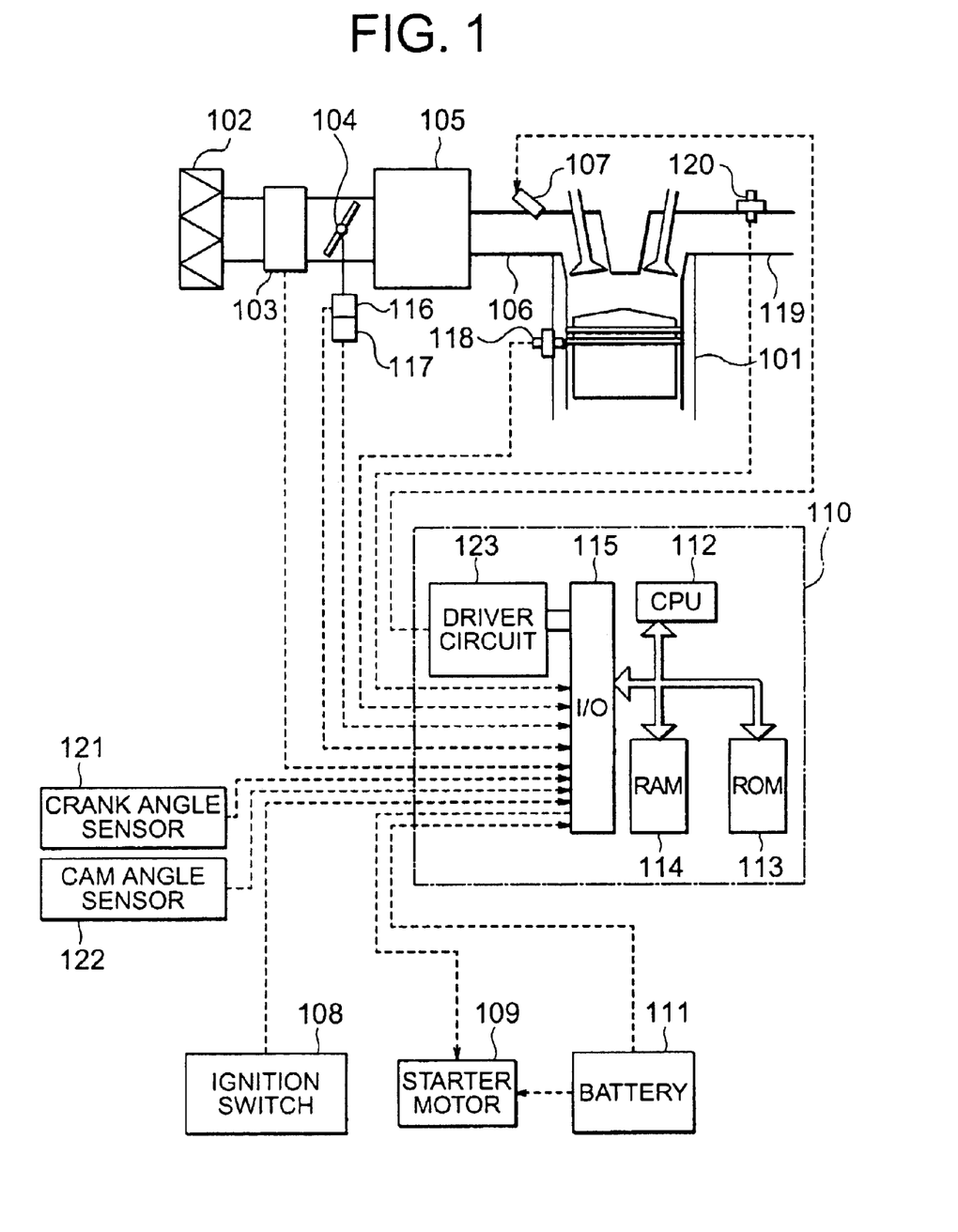
FIG. 1 is a general view showing an internal combustion engine with the starting fuel injection control device according to the embodiment 1 of the present invention and peripheral devices thereof.

FIG. 1 is a general view showing an internal combustion engine with the starting fuel injection control device according to Embodiment 1 of the present invention and peripheral devices thereof.

In FIG. 1, in the clean intake air from an air cleaner 102, the intake air amount Qa is measured by an air flow sensor 103, and the intake air amount is controlled according to the load in a throttle valve 104, and it is taken in each cylinder of an internal combustion engine 101 through a serge tank 105 and an intake tube 106. On the other hand, the fuel is injected into the intake tube 106 through an injector 107.

An ignition switch 108 is a switch which makes the internal combustion engine 101 in the state where starting is possible. The ignition switch 108 switches from OFF to ON, and furthermore, a starter motor 109 receives the supply of electric current from a battery 111 according to a command from an internal combustion engine control unit (hereafter referred to as "ECU") 110, and the crank shaft is started (hereafter referred to as "cranking"), and the internal combustion engine 101 is started.

The ECU 110 is composed of a microcomputer including a CPU 112, a ROM 113, a RAM 114 or the like, and takes in, through an input output interface 115, the intake air amount Qa which is measured by the air flow sensor 103, the throttle opening θ which is detected by the throttle sensor 116, the signal of an idle switch 117 which is turned ON at the idling opening, the internal combustion engine cooling water temperature WT which is detected by a water temperature sensor 118, the air fuel ratio output signal O2 from an air fuel ratio sensor 120 which is provided on an exhaust tube 119, the internal combustion engine revolution speed Ne which is detected by a crank angle sensor 121, the signal of a cam angle sensor 122 or the like. Furthermore, here, the sensors of the air flow sensor 103, the throttle sensor 116, the idle switch 117, the water temperature sensor 118, the air fuel ratio sensor 120, the crank angle sensor 121, and the cam angle sensor 122 compose operational state detecting unit.

The CPU 112 drives the injector 107 through a driver circuit 123 to make a specified air fuel ratio according to the control program and various kinds of maps which are stored in the ROM 113. Furthermore, the ECU 110 performs various kinds of controls such as the ignition timing control, air fuel ratio control or idle revolution speed control.

In the control program which is stored in the ROM 113, a routine is included, which realizes the starting fuel injection control system to be the special feature of the present invention, and the maps or the like necessary for this are also stored in the ROM 113. The action of the starting fuel injection control device according to the present embodiment will be described below in detail, along the contents of the routine process for realizing the starting fuel injection control system to be the special feature of the present invention.

Figure 2:
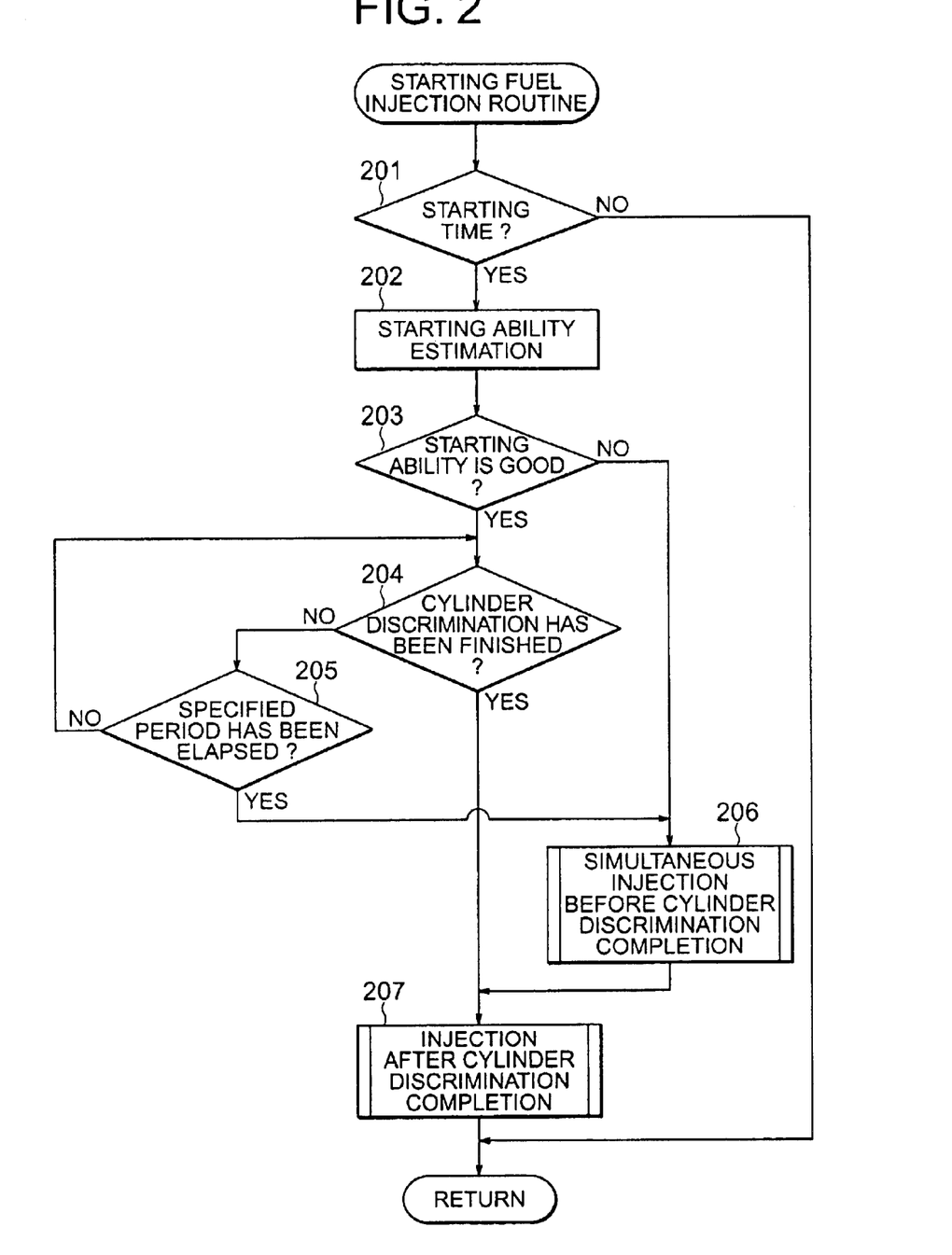
FIG. 2 is a flowchart showing the starting fuel injection routine according to the embodiment 1 of the present invention.

FIG. 2 is a flow chart showing the starting fuel injection routine according to Embodiment 1 of the present invention.

When the ignition switch 108 switches from OFF to ON, and furthermore, the cranking is started, it is judged at step 201 that the present state of the internal combustion engine 101 is the state of the starting time, and the step advances to step 202 (starting ability estimating unit). In the case where it is judged at step 201 that the state is not the state of the starting time, the routine is finished as it is.

At step 202, the starting ability of the internal combustion engine 101 is estimated. This starting ability estimation may also be, for example, an estimation made by detecting the water temperature or the battery voltage or the like before the cranking start, or an estimation made by detecting the internal combustion engine revolution speed Ne or the like after the cranking start. In the case where it is judged at step 203 that the starting ability of the internal combustion engine 101 is better than a specified level, the step advances to step 204. In the case where it is judged at step 203 that the starting ability of the internal combustion engine 101 is worse than a specified level, the step advances to step 206 and step 207, and the present routine is finished. This specified level is determined according to a previously set map.

At step 204, whether the cylinder discrimination has been finished is judged. At step 206 (first injection unit), the simultaneous injection before the completion of the cylinder discrimination is practiced, and at step 207, the injection after the completion of the cylinder discrimination is practiced. This cylinder discrimination is performed by the combination of the signal of the crank angle sensor 121 and the signal of the cam angle sensor 122, and the reference crank angle of a specific cylinder is discriminated. In the case where it is judged at step 204 that the cylinder discrimination has not been completed, the step advances to step 205. In the case where it is judged at step 204 that the cylinder discrimination has been completed, the step advances to step 207, and the present routine is finished.

At step 205, whether a specified period has been elapsed after the cranking start is judged (stopping period determining means). This specified period is determined according to a previously set map such as a map based on the water temperature. In the case where it is judged at step 205 that the specified period has been elapsed, the step advances to step 206 and step 207, and the present routine is finished. In the case where it is judged at step 205 that the specified period has not been elapsed, the step returns to step 204, and a series of processes are repeated.

Figure 3:
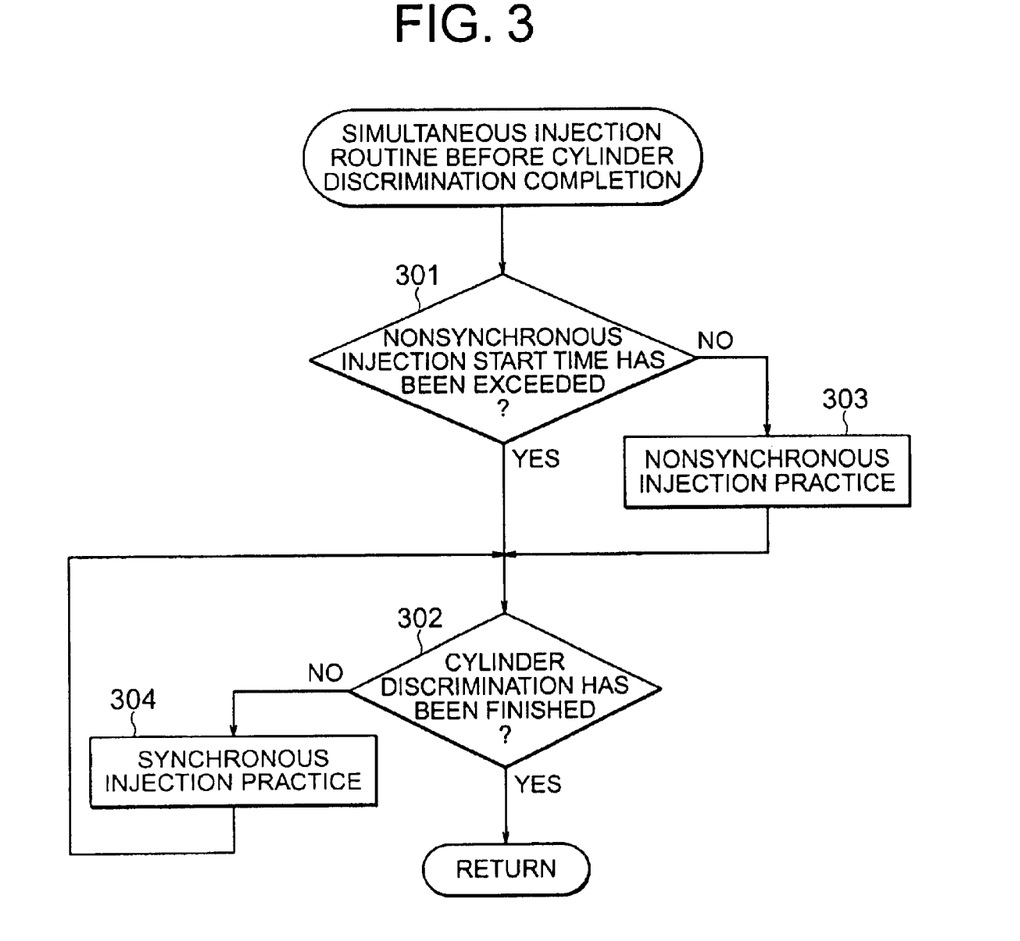
FIG. 3 is a flow chart showing the simultaneous injection routine before the completion of the cylinder discrimination according to the embodiment 1 of the present invention.

According to the above mentioned processes, after the cranking start, in the case where the internal combustion engine 101 is in the state of easy starting, the simultaneous injection before the completion of the cylinder discrimination is stopped for the specified period until the completion of cylinder discrimination, and after the elapse of the specified period, the simultaneous injection before the completion of the cylinder discrimination is practiced, and from the time just after the completion of the cylinder discrimination, the injection after the completion of the cylinder discrimination is practiced. Furthermore, in the case where the internal combustion engine 101 is in the state of difficult starting, the injection before the completion of the cylinder discrimination is practiced until the completion of the cylinder discrimination, and from the time just after the completion of the cylinder discrimination, the injection after the completion of the cylinder discrimination is practiced, FIG. 3 is a flow chart showing the routine of the simultaneous injection before the completion of the cylinder discrimination according to Embodiment 1 of the present invention. The present routine is practiced, for example, in the case of advancing to step 206 in FIG. 2. At step 301, whether the nonsynchronous injection start time has been exceeded is judged. In the case where it is judged at step 301 that the nonsynchronous injection start time has been exceeded, the step advances to step 302. In the case where it is judged at step 301 that the nonsynchronous injection start time has not been exceeded, the step advances to step 303, and the nonsynchronous injection is practiced at the nonsynchronous injection start time by a specified injection amount to all the cylinders. This specified injection amount is determined according to a previously set map based on the water temperature.

At step 302, whether the cylinder discrimination has been finished is judged. In the case where it is judged at step 302 that the cylinder discrimination has been finished, the present routine is finished, and in the case of judging that it has not been finished, the step advances to step 304, and the synchronous injection is practiced to all the cylinders by a specified injection amount. This specified injection amount is determined according to a previously set map based on the water temperature. After practicing the synchronous injection at step 304, the step returns to step 302, and a series of processes are repeated.

According to the above described processes, in the simultaneous injection before the completion of the cylinder discrimination, in the case where the nonsynchronous injection start time has been exceeded, the synchronous injection is practiced to all the cylinders until the completion of the cylinder discrimination. In the case where the nonsynchronous injection start time has not been exceeded, the nonsynchronous injection is practiced to all the cylinders, and after that, the synchronous injection is practiced to all the cylinders until the completion of the cylinder discrimination.

Figure 4:
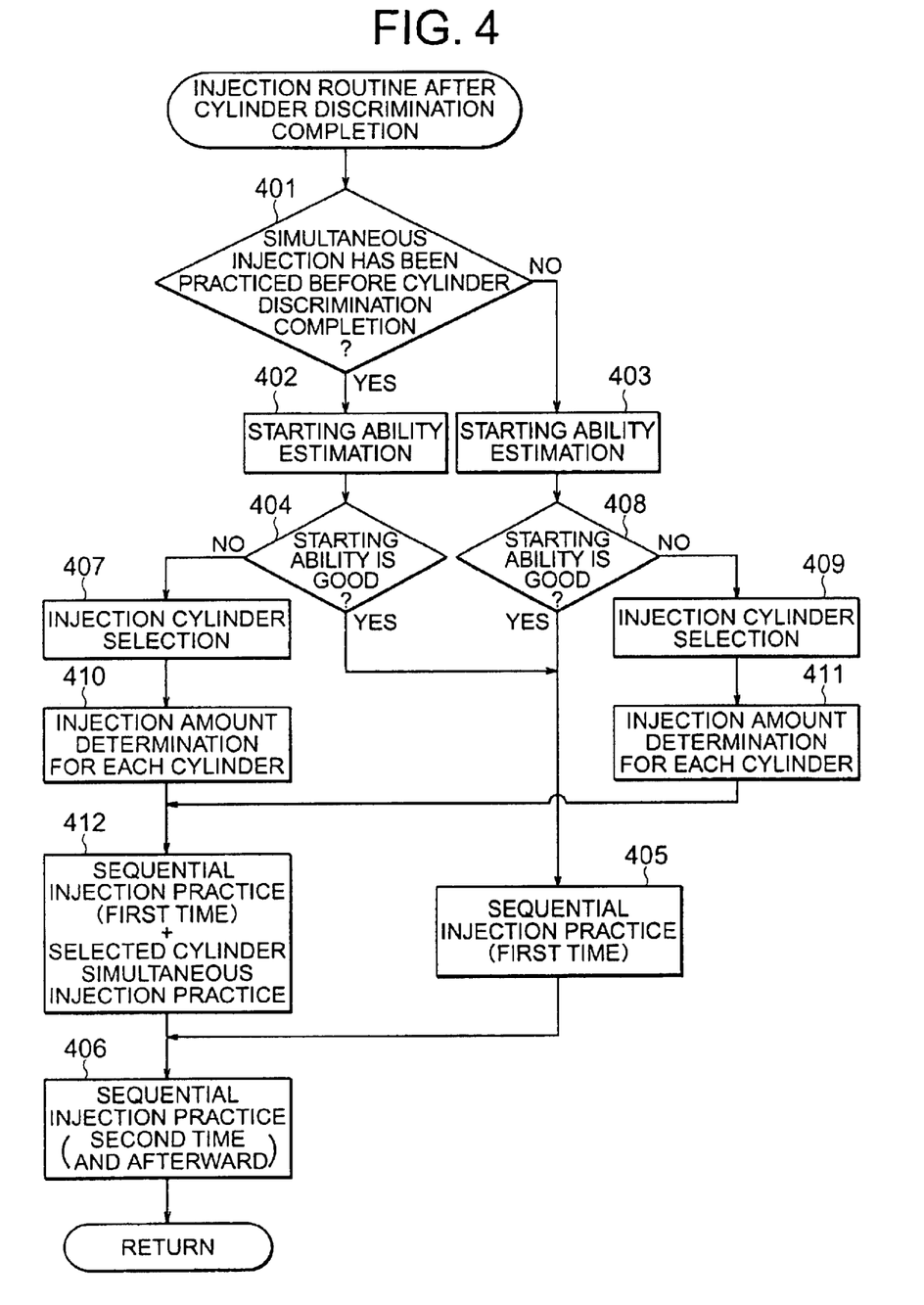
FIG. 4 is a flow chart showing the injection routine after the completion of the cylinder discrimination according to the embodiment 1 of the present invention.

FIG. 4 is a flow chart showing the routine of the injection after the completion of the cylinder discrimination according to Embodiment 1 of the present invention. The present routine is practiced, for example, in the case of advancing to step 207 in FIG. 2. At step 401, whether the simultaneous injection has been practiced before the completion of the cylinder discrimination is judged. In the case where it is judged at step 401 that the simultaneous injection has been practiced before the completion of the cylinder discrimination, the step advances to step 402, and in the case of judging that it has not been practiced, the step advances to step 403.

At step 402 or step 403, the starting ability of the internal combustion engine 101 is estimated. This starting ability estimation may also be, similarly to step 202, for example, an estimation made by detecting the water temperature or the battery voltage or the like before the cranking start or an estimation made by detecting the internal combustion engine revolution speed Ne or the like after the cranking start. In the case where it is judged at step 404 that the starting ability of the internal combustion engine 101 is better than a specified level, the step advances to step 405 and step 406, and the present routine is finished.

In the case where it is judged at step 404 that the starting ability of the internal combustion engine 101 is worse than a specified level, the step advances to step 407 (injection cylinder determining means). In the case where it is judged at step 408 that the starting ability of the internal combustion engine 101 is better than a specified level, the step advances to step 405 and step 406, and the present routine is finished. In the case where it is judged at step 408 that the starting ability of the internal combustion engine 101 is worse than a specified level, the step advances to step 409 (injection cylinder determining means). This specified level is determined according to a previously set map, and the specified levels that become the judging standards at step 404 and step 408 are both determined in the range of fulfilling the specified level that becomes the judging standard at step 203. For example, if the specified level that becomes the judging standard at step 203 is a water temperature of 20° C., it is determined that the specified level that becomes the judging standard at step 404 is a water temperature of 10° C. and the specified level that becomes the judging standard at step 408 is a water temperature of 50° C.

At step 405, the first sequential injection is practiced by the specified amount, and at step 406, the sequential injections for the second time and afterward are practiced (second injection unit). This specified injection amount is determined according to a previously set map based on the water temperature. At step 407 or step 409, an injecting cylinder is selected in order to simultaneously inject the fuel to another cylinder where intake is possible at the same time as the start of the first sequential injection, and the step advances to step 410 or step 411 (fuel injection amount determining means). This injection cylinder is selected according to a previously set map such as a map based on the cylinder discrimination results and the water temperature.

At step 410 or step 411, the fuel injection amount is determined to the cylinder which has been selected at step 407 or step 409. This fuel injection amount is determined separately for each cylinder according to a previously set map based on the water temperature. After that, the step advances to step 412 and step 406, and the present routine is finished. At step 412, the simultaneous injection is practiced (third injection unit) to the cylinder which has been selected at step 407 or step 409, at the same time as the practice of the first sequential injection.

According to the above described processes, in the injection after the completion of the cylinder discrimination, the sequential injection is practiced in the case where the internal combustion engine 101 is in the state of easy starting, in two cases: a case where the simultaneous injection has been practiced before the completion of the cylinder discrimination; and a case where it has not been practiced. Furthermore, the sequential injection is practiced and in the meantime, the simultaneous injection is practiced to another selected cylinder where the intake is possible at the same time as the first sequential injection, in the case where the internal combustion engine 101 is in the state of difficult starting, similarly in the two cases.

Figure 5:
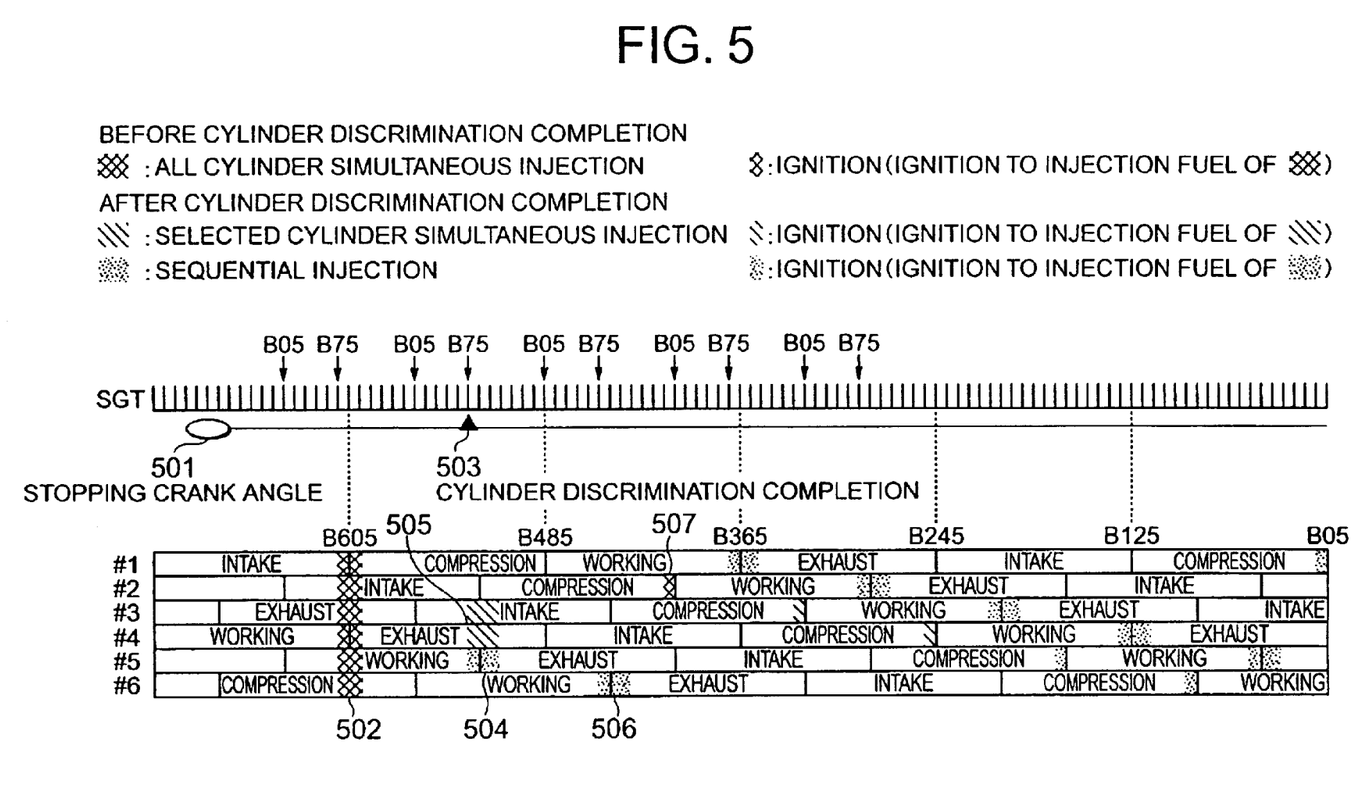
FIG. 5 is a time chart showing the action of the starting fuel injection control device according to the embodiment 1 of the present invention.

FIG. 5 is a time chart showing the action of the starting fuel injection control device according to Embodiment 1 of the present invention.

In FIG. 5, the number of cylinders of the target internal combustion engine 101 is six, but this number of cylinders of the target internal combustion engine 101 is not limited to this. Each action in FIG. 5 will be described below along the contents of the above described routine process in FIG. 2, FIG. 3, and FIG. 4.

When the internal combustion engine 101 is stopped, if the cranking is started from the crank angle 501, it is judged at step 201 that the present state of the internal combustion engine 101 is the state of the starting time, and at step 202, the starting ability is estimated. In this case, it has been judged that the starting ability is bad, and therefore, the step advances to step 206, and the contents of the routine process of the simultaneous injection before the completion of the cylinder discrimination are practiced.

At step 301, whether the nonsynchronous injection start time has been exceeded is judged, and in this case, it is judged that it has not been exceeded, and therefore, at step 303, the nonsynchronous injection 502 is practiced to all the cylinders, and the step advances to step 302. In this case, the time of the cylinder discrimination completion 503 is the same time as the timing of the synchronous injection before the completion of the cylinder discrimination, and therefore, at step 302, the step does not advance to step 304, and the routine is finished as it is, and the contents of the routine process of the injection after the completion of the cylinder discrimination are practiced.

At step 401, whether the simultaneous injection has been practiced before the completion of the cylinder discrimination is judged, and in this case, the simultaneous injection has been practiced before the completion of the cylinder discrimination, and therefore, the step advances to step 402, and the starting ability is estimated again. In this case, as a result of the second estimation of the starting ability, it has been judged at step 404 that the starting ability is bad, and therefore, the step advances to the step 407, and the cylinders of the simultaneous injection after the completion of the cylinder discrimination, that is, the cylinder #3 and the cylinder #4 in this case are selected. At step 410, the fuel injection amount is determined separately for each cylinder to both cylinders, and at step 412, simultaneously with the first sequential injection 504, the simultaneous injection 505 is practiced to the cylinder #3 and the cylinder #4. After that, at step 406, the sequential injections 506 for the second time and afterward are practiced, and the routine process is finished. The ignition for the injection fuel mentioned above is performed without a break by turns from the ignition 507, and therefore, the position of the first explosion is a position of a crank angle at the time just after the practice of the ignition 507.

Thus, in the present embodiment, in the case where the internal combustion engine is in the state of easy starting, the simultaneous injection for all the cylinders is not performed during a specified period until the completion of the cylinder discrimination, and the sequential injection is started just after the completion of the cylinder discrimination, and therefore, the starting ability is worse than that in the case where the simultaneous injection for all the cylinders is performed at all times until the completion of the cylinder discrimination, but it becomes possible to accurately control the air fuel ratio of the mixture supplied to each cylinder while ensuring a good starting ability, and it is possible to restrain the discharge of unburned gas, and to ensure a good exhaust gas emission.

Furthermore, in the case where the internal combustion engine is in the state of more difficult starting ability than that in the above described case, the simultaneous injection for all the cylinders is not performed during a specified period until the completion of the cylinder discrimination, and the sequential injection is started just after the completion of the cylinder discrimination, and in the meantime, the fuel injection is performed to another cylinder where the intake is possible simultaneously with the first sequential injection, and therefore, the starting ability is worse than that in the case where the simultaneous injection for all the cylinders is performed at all times until the completion of the cylinder discrimination, but it is better than that in the case where only the sequential injection is started just after the completion of the cylinder discrimination, and it becomes possible to accurately control the air fuel ratio of the mixture supplied to each cylinder while ensuring a good starting ability, and it is possible to restrain the discharge of unburned gas, and to ensure a good exhaust gas emission.

Furthermore, in the case where the internal combustion engine is in the state of difficult starting, the simultaneous injection for all the cylinders is performed during the period until the completion of the cylinder discrimination, and the sequential injection is started just after the completion of the cylinder discrimination, and in the meantime, the fuel injection is performed to another cylinder where the intake is possible as needed simultaneously with the first sequential injection, and therefore, it is possible to ensure a good starting ability which is equal to that of the conventional starting fuel injection control device.

Embodiment 2

In the case of the above described Embodiment 1, the simultaneous injection before the completion of the cylinder discrimination is performed to all the cylinders, but depending on the cylinder discriminating unit or the like, in the case where the injection cylinder can be selected during the period until the completion of the cylinder discrimination, it is also possible to perform the simultaneous injection before the completion of the cylinder discrimination only to a specific cylinder.

Embodiment 3

In the case of the above described Embodiment 1, as the simultaneous injection before the completion of the cylinder discrimination, the practice of the injection is judged in the order of the nonsynchronous injection and the synchronous injection, but it is not limited to this, and for example, it is also possible to judge the practice only as for the nonsynchronous injection, or to judge the practice only as for the synchronous injection.

What is claimed is:

1. A starting fuel injection control device for an internal combustion engine, comprising:
    a starting ability estimating unit for estimating the starting ability of said internal combustion engine;
    a crank angle detecting unit for outputting a crank angle signal in synchronization with a specific crank angle position of each cylinder of said internal combustion engine;
    a cylinder discriminating unit for discriminating a reference crank angle of a specific cylinder, hereafter referred to as cylinder discrimination;
    a first injection unit for simultaneously injecting fuel to all the cylinders before completion of said cylinder discrimination at the starting time;
    a second injection unit for starting independent injection by turns for each cylinder in synchronization with said crank angle signal just after completion of said cylinder discrimination; and
    a stopping period determining unit for determining whether a predetermined time period has lapsed before said cylinder discrimination has finished,
    further comprising a simultaneous injection stopping unit for stopping said simultaneous injection until completion of said cylinder discrimination, only in the case where starting ability of said internal combustion engine is estimated to be better than a specified level.

2. The starting fuel injection control device for an internal combustion engine according to claim 1, further comprising a third injection unit for starting said independent injection just after completion of said cylinder discrimination, only in the case where starting ability of said internal combustion engine is estimated to be worse than a specified level different from the level of stopping said simultaneous injection, and which simultaneously injects fuel to another cylinder where intake is possible simultaneously with the first independent injection.

3. The starting fuel injection control device for an internal combustion engine according to claim 1, further comprising a stopping period determining unit for determining, according to a previously set map, the period to stop said simultaneous injection in the time until completion of said cylinder discrimination.

4. The starting fuel injection control device for an internal combustion engine according to claim 2, further comprising an injection cylinder determining unit for determining, according to a previously set map, the injection cylinder, in the case where a plurality of cylinders where intake is possible other than the independent injection start cylinder in said simultaneous injection after completion of said cylinder discrimination.

5. The starting fuel injection control device for an internal combustion engine according to claim 2, further comprising a fuel injection amount determining unit for determining the fuel injection amount independently for each cylinder according to a previously set map, in said simultaneous injection after completion of said cylinder discrimination.

6. A starting fuel injection control device for an internal combustion engine, comprising:

a starting ability estimating unit for estimating the starting ability of said internal combustion engine;

a crank angle detecting unit for outputting a crank angle signal in synchronization with a specific crank angle position of each cylinder of said internal combustion engine;

a cylinder discriminating unit for discriminating a reference crank angle of a specific cylinder, hereafter referred to as cylinder discrimination;

a first injection unit for simultaneously injecting fuel to all the cylinders before completion of said cylinder discrimination at the starting time; and a second injection unit for starting independent injection, by turns for each cylinder in synchronization with said crank angle signal just after completion of said cylinder discrimination, further comprising a simultaneous injection stopping unit for stopping said simultaneous injection until completion of said cylinder discrimination, only in the case where starting ability of said internal combustion engine is estimated to be better than a specified level, and further comprising a third injection unit for starting said independent injection just after completion of said cylinder discrimination, only in the case where starting ability of said internal combustion engine is estimated to be worse than a specified level different from the level of stopping said simultaneous injection, and which simultaneously injects fuel to another cylinder where intake is possible simultaneously with the first independent injection.

7. The starting fuel injection control device for an internal combustion engine according to claim 6, further comprising an injection cylinder determining unit for determining, according to a previously set map, the injection cylinder, in the case where a plurality of cylinders where intake is possible other than the independent injection start cylinder in said simultaneous injection after completion of said cylinder discrimination.

8. The starting fuel injection control device for an internal combustion engine according to claim 6, further comprising a fuel injection amount determining unit for determining the fuel injection amount independently for each cylinder according to a previously set map, in said simultaneous injection after completion of said cylinder discrimination.

9. A starting fuel injection control device for an internal combustion engine, comprising a starting ability estimating unit for estimating the starting ability of said internal combustion engine;

a crank angle detecting unit for outputting a crank angle signal in synchronization with a specific crank angle position of each cylinder of said internal combustion engine;

a cylinder discriminating unit for discriminating a reference crank angle of a specific cylinder, hereafter referred to as cylinder discrimination;

a first injection unit for simultaneously injecting fuel to all the cylinders before completion of said cylinder discrimination at the starting time; and a second injection unit for starting independent injection, by turns for each cylinder in synchronization with said crank angle signal just after completion of said cylinder discrimination, further comprising a simultaneous injection stopping unit for stopping said simultaneous injection until completion of said cylinder discrimination, only in the case where starting ability of said internal combustion engine is estimated to be better than a specified level, and further comprising a stopping period determining unit for determining, according to a previously set map, the period to stop said simultaneous injection in the time until completion of said cylinder discrimination.

* * * * *